United States Patent Office 3,580,946
Patented May 25, 1971

---

3,580,946
CYANO CONTAINING STYRYL DYESTUFFS
Kenneth Anderton, Manchester, England, assignor to Imperial Chemical Industries Limited, London, England
No Drawing. Filed Dec. 13, 1968, Ser. No. 783,767
Claims priority, application Great Britain, Dec. 29, 1967, 44,095/67; Sept. 17, 1968, 59,093/68
Int. Cl. C07c *121/50*
U.S. Cl. 260—465       1 Claim

ABSTRACT OF THE DISCLOSURE

Water-insoluble styryl dyestuffs of the formula:

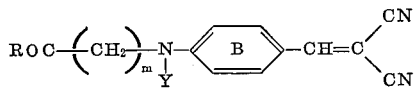

wherein R is —OR¹ or —NR²R³, R¹ is an optionally substituted hydrocarbon radical, R² and R³ are independently hydrogen or optionally substituted hydrocarbon, Y is hydrogen or alkyl, the benzene ring B may contain substituents, and $m$ is 2 or 3; and the use of the said dyestuffs for colouring synthetic textile materials.

---

This invention relates to new dyestuffs and more particularly it relates to new water-insoluble dyestuffs which are valuable for colouring synthetic textile materials.

According to the invention there are provided the water-insoluble styryl dyestuffs which are free from sulphonic acid groups, and are of the formula:

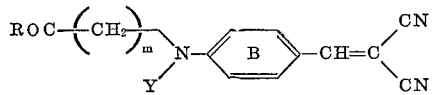

wherein R represents a —OR¹ or —NR²R³ group; wherein R¹ represents an optionally substituted hydrocarbon radical; R² and R³ each independently represent a hydrogen atom or an optionally substituted hydrocarbon radical; Y is a hydrogen atom or an alkyl radical; the benzene ring B may be optionally substituted by chlorine, bromine, lower alkyl, lower alkoxy, substituted lower alkoxy, or polyethanoxy; and $m$ is 2 or 3.

Throughout this specification the terms "lower alkyl" and "lower alkoxy" are used to denote alkyl and alkoxy groups respectively containing from 1 to 4 carbon atoms.

The alkyl radicals represented by Y are preferably lower alkyl radicals such as methyl, ethyl, n-propyl and n-butyl radicals.

As examples of the lower alkyl radicals which may be present in the benzene ring B there may be mentioned ethyl, propyl, butyl, and preferably methyl radicals. As examples of the lower alkoxy radicals which may be present in the benzene ring B there may be mentioned ethoxy, propoxy and preferably methoxy groups. As examples of substituted lower alkoxy radicals which may be present in the benzene ring B there may be mentioned hydroxy lower alkoxy such as β-hydroxyethoxy, lower alkoxy such as β-methoxyethoxy, chloro lower alkoxy such as β-chloroethoxy and acyloxy lower alkoxy such as β-acetoxyethoxy. As an example of a polyethanoxy radical which may be present in the benzene ring B there may be mentioned the β-(β'-hydroxyethoxy)ethoxy radical.

The optionally substituted hydrocarbon radicals represented by R¹, R² and R³ are preferably optionally substituted alkyl, in particular lower alkyl, cyclohexyl, aralkyl, in particular monocyclic aryl lower alkyl, and aryl, in particular monocyclic aryl radicals. As specific examples of radicals represented by R¹, R² and R³ there may be mentioned lower alkyl such as methyl, ethyl, n-propyl and n-butyl; substituted lower alkyl, for example hydroxy lower alkyl such as β-hydroxyethyl and β- or γ-hydroxypropyl, cyano lower alkyl such as β-cyanoethyl, chloro lower alkyl such as β-chloroethyl and β- or γ-chloropropyl, bromo lower alkyl such as β-bromoethyl, lower alkoxy lower alkyl such as β-(methoxy or ethoxy)ethyl and β- or γ-(methoxy or ethoxy)propyl; cycloalkyl such as cyclohexyl; aralkyl such as benzyl and β-phenylethyl; and optionally substituted monocyclic aryl such as phenyl, tolyl, chlorophenyl, bromophenyl, methoxyphenyl, and nitrophenyl.

According to a further feature of the invention there is provided a process for the manufacture of the water-insoluble styryl dyestuffs, as hereinbefore defined, which comprises reacting with malonodinitrile an aldehyde of the formula:

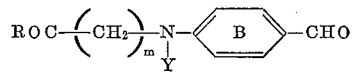

Formula I wherein B, R, Y and $m$ have the meanings stated.

The process of the invention may be conveniently brought about by stirring the reactants together in an organic solvent, such as methanol, and in the presence of a basic compound, such as ammonia or a secondary amine such as diethylamine or piperidine or an alkali metal derivative of an alcohol such as the sodium derivative of methanol or ethanol, the reaction being preferably carried out at a temperature between 20° C., and the boiling point of the organic solvent. The dyestuff so obtained is then isolated by conventional methods, for example by filtering off the precipitated dyestuff or by removing the organic solvent by distillation, or by adding a liquid, such as water, which precipitates the dyestuff from the solution in the organic solvent.

The aldehydes of Formula I can themselves be obtained by reacting a compound of the formula:

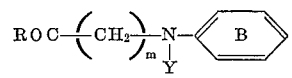

wherein B, R, Y and $m$ have the meanings stated, with hexamethylenetetramine in ethanol, treating with a mixture of formic and acetic acids, and finally treating with a dilute aqueous solution of hydrochloric acid.

The dyestuffs, as hereinbefore defined, are valuable for colouring synthetic textile materials, for example cellulose acetate textile materials such as secondary cellulose acetate and cellulose triacetate textile materials, polyamide textile materials such as polyhexamethyleneadipamide textile materials, and preferably aromatic polyester textile materials such as polyethylene terephthalate textile materials. Such textile materials can be in the form of thread, yarn, or woven or knitted fabric.

Such textile materials can conveniently be coloured with the dyestuffs, as hereinbefore defined, by immersing the textile materials in a dye-bath comprising an aqueous dispersion of one or more of the said dyestuffs, which dyebath preferably contains a non-ionic, cationic or anionic surface-active agent or a mixture of one or more such agents, and thereafter heating the dyebath for a period at a suitable temperature. In the case of secondary cellulose acetate textile material it is preferred to carry out the dyeing process at a temperature between 60° and 85° C.; in the case of cellulose triacetate or polyamide textile materials it is preferred to carry out the dyeing process at 95° to 100° C.; in the case of aromatic polyester textile materials the dyeing process can either be carried out at a temperature between 90° and 100° C., preferably in the presence of a carrier such as diphenyl or o-hydroxydiphenyl, or at a temperature above 100° C., preferably at a temperature between 120° and 140° C., under superatmospheric pressure.

Alternatively the aqueous dispersion of the said dyestuff can be applied to the textile material by a padding or printing process, followed by heating or steaming of the textile material. In such process it is preferred to incorporate a thickening agent, such as gum tragacanth, gum arabic or sodium alginate, into the aqueous dispersion of the said dyestuff.

At the conclusion of the colouring process it is preferred to give the coloured textile material a rinse in water or a brief soaping treatment before finally drying the coloured textile material. In the case of aromatic polyester textile material it is also preferred to subject the coloured textile material to a treatment in an alkaline aqueous solution of sodium hydrosulphite before the soaping treatment in order to remove loosely attached dyestuff from the surface of the textile material.

The styryl dyestuffs of the invention have excellent affinity and build-up properties on synthetic textile materials, so enabling heavy depths of shade to be obtained. The resulting colorations, which range in shade from greenish-yellow to orange, have excellent fastness to light, to wet treatments, and, in particular, to dry heat treatments such as those carried out at high temperatures during pleating operations.

One preferred class of the styryl dyestuffs of the invention comprises the dyestuffs of the formula:

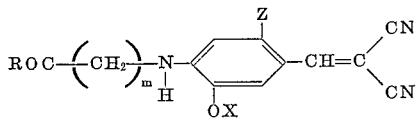

wherein R and $m$ have the meanings state, Z represents chlorine, bromine, lower alkyl or lower alkoxy, and X represents an optionally substituted lower alkyl radical, in particular the methyl radical. The dyestuffs of this preferred class have excellent build-up properties on aromatic polyester textile materials.

A second preferred class of the styryl dyestuffs of the invention comprises the dyestuffs of the formula:

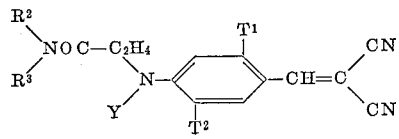

wherein $R^2$, $R^3$ and Y have the meanings stated, and $T^1$ and $T^2$ each independently represent hydrogen, lower alkyl or lower alkoxy.

The invention is illustrated but not limited by the following examples in which the parts and percentages are by weight:

EXAMPLE 1

A mixture of 25.1 parts of 4-[β-(methoxycarbonyl)-ethylamino] - 5 - methoxy - 2 - methylbenzaldehyde, 6.6 parts of malonodinitrile, 15 parts of ethanol and 0.1 part of piperidine is stirred at the boil under a reflux condenser for 30 minutes. The mixture is then cooled and the precipitated dyestuff is filtered off and dried.

When dispersed in aqueous medium the dyestuff so obtained dyes aromatic polyester textile materials in bright yellow shades of excellent fastness properties.

The aldehyde used in this example was obtained as follows:

A mixture of 20.7 parts of N-[β-(methoxycarbonyl)-ethyl]-2-methoxy - 5 - methylaniline, 20 parts of hexamethylenetetramine and 15 parts of ethanol was stirred at the boil under a reflux condenser for 15 minutes. 15 parts of a mixture of equal parts of formic acid and acetic acid were then added, the mixture was stirred at the boil for 2½ hours during which time a further 30 parts of the same mixture of acids were gradually added, and the mixture was then poured into 200 parts of a 1.8% aqueous solution of hydrochloric acid, the resulting mixture stirred for 4 hours, and the aldehyde which separated out as an oil, was extracted with chloroform, and the chloroform was then removed from the extract by distillation.

The following table gives further examples of the styryl dyestuffs of the invention having the formula:

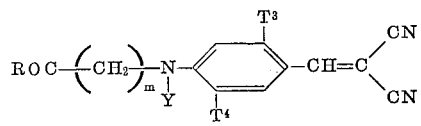

the symbols of which have the values given in the respective columns of the table. The melting points of the dyestuffs are given in the last column of the table.

| Example | R | Y | T³ | T⁴ | m |
|---|---|---|---|---|---|
| 2 | Anilino | Hydrogen | Hydrogen | Methoxy | 2 |
| 3 | do | do | Methyl | do | 2 |
| 4 | 2-methoxy-5-methylanilino | do | do | do | 2 |
| 5 | Diethylamino | do | do | do | 2 |
| 6 | Cyclohexylamino | do | do | do | 2 |
| 7 | Benzylamino | do | do | do | 2 |
| 8 | Anilino | Ethyl | Hydrogen | Methyl | 2 |
| 9 | Benzyloxy | Hydrogen | Methyl | Methoxy | 2 |
| 10 | Hydroxyethoxy | do | do | do | 2 |
| 11 | Methoxy | Ethyl | do | Hydrogen | 2 |
| 12 | n-Propylamino | Hydrogen | do | Methoxy | 2 |
| 13 | o-Bromoanilino | do | do | do | 2 |
| 14 | p-chloroanilino | do | do | do | 2 |
| 15 | p-Nitroanilino | do | do | do | 2 |
| 16 | Diethylamino | Methyl | Hydrogen | Hydrogen | 2 |
| 17 | p-Chloroanilino | do | do | do | 2 |
| 18 | Anilino | Hydrogen | Chlorine | Methoxy | 2 |
| 19 | do | do | Bromine | do | 2 |
| 20 | do | do | Methyl | β-Acetoxyethoxy | 2 |
| 21 | do | do | do | Methoxy | 3 |
| 22 | do | do | do | β-Chloroethoxy | 2 |
| 23 | do | do | do | β-(β'-Hydroxyethoxy)-ethoxy | 2 |
| 24 | γ-Methoxypropylamino | Methyl | do | Methoxy | 2 |
| 25 | Di(β-hydroxyethyl)amino | do | do | do | 2 |
| 26 | β-Chloroethoxy | do | do | do | 2 |
| 27 | β-Cyanoethoxy | do | do | do | 2 |
| 28 | Methoxy | Methyl | do | Hydrogen | 3 |

The dyestuffs of these examples were prepared by condensing the appropriately substituted benzaldehyde with malonodinitrile by methods similar to that described in Example 1.

When these dyestuffs were applied to polyethylene terephthalate textile materials from an aqueous dyebath bright yellow shades of excellent fastness properties were obtained.

The appropriately substituted benzaldehyde required as starting materials for the dyestuffs of these examples were themselves obtained by the methods described in the last paragraph of Example 1 but starting from the corresponding compound of the formula:

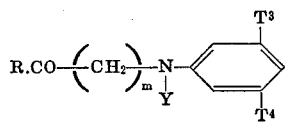

wherein R, $m$, Y, $T^3$ and $T^4$ have the values indicated above.

I claim:
1. A water-insoluble styryl dyestuff of the formula:

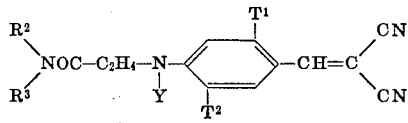

wherein
$R^2$ is selected from the group consisting of hydrogen, lower alkyl and hydroxy lower alkyl;
$R^3$ is selected from the group consisting of lower alkyl, lower alkoxy lower alkyl, hydroxy lower alkyl, benzyl, cyclohexyl, phenyl and phenyl containing a substituent selected from the group consisting of chlorine, bromine, nitro, methyl and methoxy;
Y is selected from the group consisting of hydrogen and lower alkyl; and
$T^1$ and $T^2$ are each independently selected from the group consisting of hydrogen, lower alkyl and lower alkoxy.

References Cited
UNITED STATES PATENTS

| | | | |
|---|---|---|---|
| 2,583,551 | 1/1952 | Dickey et al. | 260—465 |
| 2,583,614 | 1/1952 | Taylor et al. | 260—465 |
| 3,141,018 | 7/1964 | Straley et al. | 260—465X |

CHARLES B. PARKER, Primary Examiner

C. F. WARREN, Assistant Examiner

U.S. Cl. X.R.
8—162R, 178, 179

ICI D.20740

PO-1050
(5/69)

UNITED STATES PATENT OFFICE
CERTIFICATE OF CORRECTION

Patent No. 3,580,946  Dated May 25, 1971

Inventor(s) Kenneth Anderton

It is certified that error appears in the above-identified patent and that said Letters Patent are hereby corrected as shown below:

In the heading under priority information, change "Dec. 29, 1967, 44,095/67; Sept. 17, 1968, 59,093/68" to --59,093/67, December 29, 1967; 44,095/68, Sept. 17, 1968; complete, December 4, 1968.--

Column 4, lines 47-48 of the patent, delete the sentence "The melting points of the dyestuffs are given in the last column of the table."

Signed and sealed this 3rd day of April 1973.

(SEAL)
Attest:

EDWARD M. FLETCHER, JR.
Attesting Officer

ROBERT GOTTSCHALK
Commissioner of Patents